United States Patent
Yokoyama et al.

(10) Patent No.: US 6,833,220 B1
(45) Date of Patent: Dec. 21, 2004

(54) ELECTROLYTE FOR SECONDARY BATTERY AND SECONDARY BATTERY

(75) Inventors: Shoichi Yokoyama, Yokahama (JP); Masataka Wakihara, Yokohama (JP); Takao Kobayashi, Mihara-gun (JP); Kentaro Suwa, Oota-ku (JP)

(73) Assignee: NOF Corporation, Tokyo (JP)

( * ) Notice: Subject to any disclaimer, the term of this patent is extended or adjusted under 35 U.S.C. 154(b) by 377 days.

(21) Appl. No.: 10/130,952

(22) PCT Filed: Nov. 22, 2000

(86) PCT No.: PCT/JP00/08254

§ 371 (c)(1),
(2), (4) Date: May 24, 2002

(87) PCT Pub. No.: WO01/39316

PCT Pub. Date: May 31, 2001

(30) Foreign Application Priority Data

Nov. 24, 1999 (JP) ............................................. 11-332586
Mar. 28, 2000 (JP) ......................................... 2000-087754

(51) Int. Cl.$^7$ ............................. H01M 6/18; H01M 6/24
(52) U.S. Cl. ......................... 429/317; 429/309; 429/322
(58) Field of Search ................................. 429/303, 309, 429/315, 317, 322

(56) References Cited

U.S. PATENT DOCUMENTS 6,322,930 B1 * 11/2001 Yoshimura et al. .......... 429/341

FOREIGN PATENT DOCUMENTS

| JP | 05036305 A | * | 2/1993 | ............ H01B/1/06 |
| JP | 05151992 A | * | 6/1993 | ........... H01M/10/40 |
| JP | 05315007 A | * | 11/1993 | ........... H01M/10/40 |
| JP | 11219726 A | * | 8/1999 | ........... H01M/10/40 |

* cited by examiner

*Primary Examiner*—Patrick Ryan
*Assistant Examiner*—Tracy Dove
(74) *Attorney, Agent, or Firm*—Sughrue Mion, PLLC

(57) ABSTRACT

The invention provides an electrolyte for secondary battery having a high ionic conductivity and an excellent safety and a secondary battery having an excellent cycle life performance comprising such an electrolyte.

In other words, the invention lies in an electrolyte for secondary battery comprising an ionic compound and an organic polymer compound, wherein the organic polymer compound comprises a compound represented by the general formula (1) or a boric acid ester compound obtained by the esterification of the compound represented by the general formula (1) with boric acid or boric anhydride:

$$Z^1-[(A^1O)_l-R^1]_a \qquad (1)$$

wherein $Z^1$ represents a residue of compound having from 1 to 6 hydroxyl groups; $A^1O$ represents one or a mixture of two or more of $C_2$–$C_4$ oxyalkylene groups; $R^1$ represents a group selected from the group consisting of cyanoethyl group, $C_1$–$C_{12}$ hydrocarbon group and hydrogen atom; $l$ represents an integer of from 0 to 600; and the suffix $a$ represents an integer of from 1 to 6, with the proviso that $la$ ranges from 0 to 600, and a secondary battery comprising the electrolyte for secondary battery,

32 Claims, No Drawings

ELECTROLYTE FOR SECONDARY BATTERY AND SECONDARY BATTERY

TECHNICAL FIELD

The present invention relates to an electrolyte for secondary battery which is a polymer electrolyte and a secondary battery comprising such an electrolyte for secondary battery and more particularly to an electrolyte for secondary battery which is a polymer electrolyte useful as a material for electrochemical device such as battery showing a high ionic conductivity and a secondary battery comprising such an electrolyte.

BACKGROUND OF THE INVENTION

In recent years, there has been a growing demand for the enhancement of performance of and the reduction of size of electronic products. Thus, the battery material as an energy source for these electronic products have been required to have a smaller size, a lighter weight and a higher capacity and energy density. Various studies and developments have been underway.

In recent years, as such an energy source for electronic products there has been used a lithium secondary battery. A lithium secondary battery normally comprises a metal oxide as a cathode, a carbon-based material or the like as an anode, and a separator and an electrolyte interposed therebetween. This is a secondary battery having a high energy density. However, since the lithium secondary battery comprises an electrolyte, it has a safety problem arising from electrolyte leakage. Further, since the lithium secondary battery needs to comprise a metal can as an outer case to prevent electrolyte leakage, it finds difficulty in reducing the weight thereof.

In order to overcome shortcomings caused by the use of electrolyte, studies have been made of so-called polymer electrolyte, i.e., electrolyte comprising a polymer compound. A polymer electrolyte is flexible and thus can follow mechanical impact and even the change of volume of electrode caused by ion-electron exchange reaction between electrode and electrolyte.

As such a polymer electrolyte there has been proposed in U.S. Pat. No. 4,303,748 a solid electrolyte having an alkaline metal salt or alkaline earth metal salt dissolved in a polyalkylene oxide. However, this solid electrolyte has an insufficient ionic conductivity and a high contact resistance with respect to electrode material and thus leaves something to be desired. Such an electrolyte having an insufficient ionic conductivity cannot provide a sufficient current density during charge and discharge and thus cannot be put to use in purposes requiring a large current, restricting the use.

On the other hand, a system called gel electrolyte having an organic polymer compound impregnated with a non-aqueous organic solvent has been proposed in Japanese Patent Publication No. 1986-23945, Japanese Patent Publication No. 1986-23947, and U.S. Pat. Nos. 4,830,939 and 5,429,891. Such a gel electrolyte comprises an electrolytic solution encapsulated in a polymer compound as a matrix to have an ionic conductivity. However, a problem arises that the retention of electrolytic solution can be lost or deteriorated with the change of temperature. Further, in order to obtain a high ionic conductivity, it is necessary that the polymer compound be impregnated with a larger amount of electrolytic solution. In this case, however, it is likely that the retention of electrolytic solution can be deteriorated or the electrolyte leakage can occur.

Moreover, J. Polymer Science, "Polymer Physics", vol. 21, page 939, 1983 proposes a polymer electrolyte comprising a polyacrylonitrile as a substrate. When impregnated with a non-aqueous organic solvent, this polymer electrolyte exhibits a certain conductivity. However, when not impregnated with a non-aqueous organic solvent, this polymer electrolyte exhibits insufficient ionic conductivity. Thus, similarly to the aforementioned polymer electrolyte, this polymer electrolyte cannot provides sufficient current density during charge and discharge and cannot be put to use in purposes requiring a large current, restricting the use.

An aim of the invention is to provide an electrolyte for secondary battery which is a polymer electrolyte having a high ionic conductivity and an excellent safety useful as a material for electrochemical device such as secondary battery and a secondary battery having an excellent cycle life performance comprising such an electrolyte.

DISCLOSURE OF THE INVENTION

In other words, the invention lies in:

(a) An electrolyte for secondary battery comprising an ionic compound and an organic polymer compound, wherein the organic polymer compound comprises a compound represented by the general formula (1) or a boric acid ester compound obtained by the esterification of the compound represented by the general formula (1) with boric acid or boric anhydride:

$$Z^1-[(A^1O)_l-R^1]_a \quad (1)$$

wherein $Z^1$ represents a residue of compound having from 1 to 6 hydroxyl groups; $A^1O$ represents one or a mixture of two or more of $C_2$–$C_4$ oxyalkylene groups; $R^1$ represents a group selected from the group consisting of cyanoethyl group, $C_1$–$C_{12}$ hydrocarbon group and hydrogen atom; l represents an integer of from 0 to 600; and the suffix a represents an integer of from 1 to 6, with the proviso that la ranges from 0 to 600;

(b) The electrolyte for secondary battery according to Clause (a), wherein the organic polymer compound comprises a boric acid ester compound obtained by the esterification of a compound represented by the general formula (1) wherein $R^1$ is a hydrogen atom with boric acid or boric anhydride;

(c) The electrolyte for secondary battery according to Clause (a), wherein the organic polymer compound comprises a nitrile group-containing compound represented by the general formula (1) wherein at least one of $R^1$'s is a cyanoethyl group;

(d) An electrolyte for secondary battery comprising an ionic compound and an organic polymer compound, wherein the organic polymer compound comprises a polymerization product of a compound represented by the general formula (2) or a polymerization product of a boric acid ester compound obtained by the esterification of the compound represented by the general formula (2) with boric acid or boric anhydride:

$$Z^2-[(A^2O)_m-R^2]_b \quad (2)$$

wherein $Z^2$ represents a residue of compound having from 1 to 4 hydroxyl groups; $A^2O$ represents one or a mixture of two or more of $C_2$–$C_4$ oxyalkylene groups; m represents an integer of from 0 to 150; b represents an integer of from 1 to 4, with the proviso that mb ranges from 0 to 300; and $R^2$ represents a hydrogen atom, cyanoethyl group or a group represented by the general formula (3):

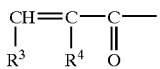

(3)

wherein $R^3$ and $R^4$ each represent a hydrogen atom or methyl group;

(e) The electrolyte for secondary battery according to Clause (d), wherein the organic polymer compound comprises a polymerization product of a boric acid ester compound obtained by the esterification of a compound represented by the general formula (2) wherein $R^2$ is a hydrogen atom with boric acid or boric anhydride;

(f) The electrolyte for secondary battery according to Clause (d, wherein the organic polymer compound comprises a nitrile group-containing compound represented by the general formula (2) wherein at least one of $R^2$'s is a cyanoethyl group;

(g) The electrolyte for secondary battery according to Clause (a), wherein the organic polymer compound further comprises a polymerization product of a compound represented by the general formula (4):

(4)

wherein $Z^3$ represents a residue of compound having from 1 to 4 hydroxyl groups or a hydroxyl group; $A^3O$ represents one or a mixture of two or more of $C_2$–$C_4$ oxyalkylene groups; n represents an integer of from 0 to 150; c represents an integer of from 1 to 4, with the proviso that nc ranges from 0 to 300; and $R^5$ represents a hydrogen atom or a group represented by the general formula (5):

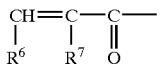

(5)

wherein $R^6$ and $R^7$ each represent a hydrogen atom or methyl group;

(h) The electrolyte for secondary battery according to Clause (a) or (g), wherein the organic polymer compound further comprises an organic polymer compound represented by the general formula (6):

(6)

wherein $Z^4$ represents a residue of compound having from 1 to 6 hydroxyl groups; $A^4O$ represents one or a mixture of two or more of $C_2$–$C_4$ oxyalkylene groups; o represents an integer of from 100 to 150,000; and d represents an integer of from 1 to 6, with the proviso that od ranges from 100 to 150,000;

(i) The electrolyte for secondary battery according to Clause (a), wherein the organic polymer compound comprises a polymerization product of a nitrile group-containing compound represented by the general formula (2) or a polymerization product of a boric acid ester compound obtained by the esterification of a nitrile group-containing compound represented by the general formula (2) with boric acid or boric anhydride;

(j) The electrolyte for secondary battery according to Clause (d), wherein the organic polymer compound further comprises a polymerization product of a compound represented by the general formula (4);

(k) The electrolyte for secondary battery according to Clause (i), wherein the organic polymer compound further comprises a polymerization product of a compound represented by the general formula (4);

(l) The electrolyte for secondary battery according to Clause (d), (j) or (k), wherein the organic polymer compound further comprises an organic polymer compound represented by the general formula (6);

(m) The electrolyte for secondary battery according to Clause (a), (d), (g), (h), (i), (j), (k) or (l), wherein the ionic compound is an alkaline metal salt or alkaline earth metal salt;

(n) The electrolyte for secondary battery according to Clause (m), wherein the ionic compound is a lithium salt; and (o) A secondary battery comprising an electrolyte for secondary battery defined in Clause (a), (d), (g), (h), (i), (j), (k), (l), (m) or (n).

BEST MODE FOR CARRYING OUT THE INVENTION

In the compounds represented by the general formulae (1) and (6) to be used in the invention, $Z^1$ and $Z^4$ each are a residue of compound having from 1 to 6 hydroxyl groups.

Examples of the compound having from 1 to 6 hydroxyl groups include monool such as methyl alcohol, ethyl alcohol, propyl alcohol, isopropyl alcohol, allyl alcohol, n-butyl alcohol, 2-butyl alcohol, t-butyl alcohol, n-hexyl alcohol, n-octyl alcohol, isooctyl alcohol, decyl alcohol, dodecyl alcohol, tridecyl alcohol, tetradecyl alcohol, hexadecyl alcohol, octadecyl alcohol, octadecenyl alcohol, icosyl alcohol and tetraicosyl alcohol, diol such as ethylene glycol, propylene glycol, butanediol, pentanediol, hexanediol and octanediol, triol such as glycerin and trimethyolpropane, and tetraol such as pentaerythritol and diglycerin. The compound having from 1 to 6 hydroxyl groups is preferably a $C_1$–$C_{24}$ compound, more preferably a $C_1$–$C_5$ compound having from 1 to 4 hydroxyl groups.

In the compounds represented by the general formulae (2) and (4) to be used in the invention, $Z^2$ and $Z^3$ each are a residue of compound having from 1 to 4 hydroxyl groups or a hydroxyl group.

Examples of the compound having from 1 to 4 hydroxyl groups include monool such as methyl alcohol, ethyl alcohol, propyl alcohol, isopropyl alcohol, allyl alcohol, n-butyl alcohol, 2-butyl alcohol, t-butyl alcohol, n-hexyl alcohol, n-octyl alcohol, isooctyl alcohol, decyl alcohol, dodecyl alcohol, tridecyl alcohol, tetradecyl alcohol, hexadecyl alcohol, octadecyl alcohol, octadecenyl alcohol, icosyl alcohol and tetraicosyl alcohol, diol such as ethylene glycol, propylene glycol, butanediol, pentanediol, hexanediol and octanediol, triol such as glycerin and trimethyolpropane, tetraol such as pentaerythritol and diglycerin, and polymerizable group-containing compound such as acrylic acid, methacrylic acid and crotonic acid. $Z^2$ and $Z^3$ each are preferably a hydroxyl group or a residue of methyl alcohol, ethylene glycol, propylene glycol, glycerin, trimethylol propane, pentaerythritol, diglycerin, acrylic acid or methacrylic acid, more preferably a hydroxyl group or a residue of methyl alcohol, ethylene glycol, propylene glycol, acrylic acid or methacrylic acid.

In the general formulae (1), (2), (4) and (6), the $C_2$–$C_4$ oxyalkylene groups represented by $A^1O, A^2O, A^3O$ and $A^4O$ include oxyethylene group, oxypropylene group, oxybutylene group, and oxytetramethylene group. Preferred among these oxyalkylene groups are oxyethylene group and oxypropylene group. These oxyalkylene groups may be used singly or in admixture of two or more thereof. The polymerization of two or more of these oxyalkylene groups may be accomplished by either block polymerization process or random polymerization process.

$R^1$ is a group selected from the group consisting of cyanoethyl group, C1–C12 hydrocarbon group and hydrogen atom.

In the case of the boric acid ester compound obtained by the esterification of a compound represented by the general formula (1) with boric acid or boric anhydride (hereinafter referred to as "boric acid ester compound derived from the general formula (1)"), at least one of $R^1$'s is a hydrogen atom. Preferably, all $R^1$'s each are a hydrogen atom.

In the case of nitrile group-containing compound, at least one of $R^1$'s is a cyanoethyl group. Preferably, half or more of $R^1$'s each are a cyanoethyl group. More preferably, all $R^1$'s each are a cyanoethyl group.

In the general formula (2), $R^2$ is a hydrogen atom, cyanoethyl group or a group represented by the general formula (3), with the proviso that when there are two or more $R^2$'s, they may be the same or different.

In the case of the boric acid ester compound obtained by the esterification of a compound represented by the general formula (2) with boric acid or boric anhydride (hereinafter referred to as "boric acid ester compound derived from the general formula (2)"), at least one of $R^2$'s is a hydrogen atom. Preferably, all $R^2$'s each are a hydrogen atom.

In the case of nitrile group-containing compound, at least one of $R^2$'s is a cyanoethyl group. Preferably, half or more of $R^2$'s each are a cyanoethyl group. More preferably, all $R^2$'s each are a cyanoethyl group.

In the general formula (4), $R^5$ is a hydrogen atom or a group represented by the general formula (5), with the proviso that when there are two or more $R^5$'s, they may be the same or different.

In the groups represented by the general formulae (3) and (5), $R^3$, $R^4$, $R^6$ and $R^7$ each are a hydrogen atom or methyl group. The groups represented by the general formula (3) and (5) each are preferably an acryloyl group wherein $R^3$, $R^4$, $R^6$ and $R^7$ each are a hydrogen atom, respectively. Alternatively, the groups represented by the general formula (3) and (5) each are preferably a methacryloyl group wherein $R^3$ and $R^6$ each are a hydrogen group and $R^4$ and $R^7$ each are a methyl group.

The polymerization product of a compound represented by the general formula (2) or (4) is a product of polymerization of polymerizable group which is a residue of polymerizable group-containing compound such as acrylic acid, methacrylic acid and crotonic acid. The compound represented by the general formula (2) or (4) has at least one polymerizable group. In some detail, when $Z^2$ and $Z^3$ each are not a residue of polymerizable group-containing compound such as acrylic acid, methacrylic acid and crotonic acid, at least one of $R^2$ and $R^5$ has a polymerizable group represented by the general formula (3) or (5).

The polymerization product of a compound represented by the general formula (2) has a cyanoethyl group and a hydroxyl group per molecule and may be esterified with boric acid to a boric acid ester compound. Alternatively, a polymerization product of nitrile group-containing compound and a polymerization product of boric acid ester compound may be used in admixture.

The suffix l represents the average mol number Of $C_2$–$C_4$ oxyalkylene group and is from 0 to 600, preferably from 0 to 100, more preferably from 1 to 100. When the suffix l exceeds 600, the amount of boric acid ester bond to be incorporated is too small to obtain a high ionic conductivity.

The suffix a is from 1 to 6, preferably from 1 to 4.

The product la is from 0 to 600, preferably from 0 to 100, more preferably from 1 to 100. When the product la exceeds 600, the amount of boric acid ester bond or nitrile group to be incorporated is too small to obtain a high ionic conductivity.

The suffixes m and n each are the average mol number of $C_2$–$C_4$ oxyalkylene group and each are from 0 to 150, preferably from 1 to 100 for the purpose of obtaining the desired ionic conductivity. When the suffixes m and n each exceed 150, the amount of polymerizable group to be incorporated is too small to obtain a mechanical strength required for matrix.

The suffixes b and c each are from 1 to 4, preferably from 1 to 3.

The product mb and nc each are from 0 to 300, preferably from 0 to 150, more preferably from 1 to 100. When the product mb and nc each exceed 300, the amount of polymerizable group to be incorporated is too small to obtain a mechanical strength required for matrix.

The suffix o is the average mol number of $C_2$–$C_4$ oxyalkylene group and is from 100 to 150,000, preferably from 200 to 120,000. When the suffix o falls below 100, the resulting organic polymer compound becomes fluidized when mixed with an ionic compound and thus can hardly exert a matrix effect. On the contrary, when the suffix o exceeds 150,000, the resulting organic polymer exhibits an insufficient solubility in the solvent used for the preparation of boric acid ester compound or electrolyte film to disadvantage.

The suffix d is from 1 to 6, preferably from 1 to 4.

The product od is from 100 to 150,000, preferably from 200 to 120,000. When the product od falls below 100, the resulting organic polymer compound becomes fluidized when mixed with an ionic compound and thus can hardly exert a matrix effect. On the contrary, when the product od exceeds 150,000, the resulting organic polymer exhibits an insufficient solubility in the solvent used for the preparation of boric acid ester compound or electrolyte film to disadvantage.

The compounds represented by the general formulae (1), (2), (4) and (6) to be used in the invention can be obtained by an ring opening polymerization process which has heretofore been known. These compounds can be synthesized, e,g, by polymerizing a compound having a hydroxyl group with a $C_2$–$C_4$ alkylene oxide such as ethylene oxide, propylene oxide, butylene oxide and tetrahydrofurane at a predetermined molar ratio in the presence of a ring opening polymerization catalyst such as alkaline metal salt (e.g., potassium hydroxide, lithium hydroxide, sodium methylate) and Lewis acid (e.g., boron trifluoride etherate, tin tetrachloride, aluminum trioxide).

The aforementioned ring opening polymerization may be followed by alkyletherification reaction. For example, the aforementioned reaction product may be reacted with a halogenated hydrocarbon such as methyl chloride, butyl chloride, octyl chloride, methyl bromide, butyl bromide and allyl chloride at a predetermined molar ratio in the presence of an alkaline metal salt such as sodium hydroxide, potassium hydroxide and lithium hydroxide as a catalyst to complete synthesis.

The boric acid ester compound to be used in the invention can be obtained by a process which comprises adding a boric acid such as orthoboric acid, metaboric acid and pyroboric acid or boric anhydride to a compound represented by the general formula (1) or (2), and then subjecting the mixture to dehydration reaction in vacuo at a temperature of from 50° C. to 200° C. in a stream of inert gas. For example, the mixture may be subjected to dehydration reaction with stirring at a temperature of from 60° C. to 120° C. and a pressure as low as from 1.33 to 6.67 kPa (10 to 50 mmHg) in a proper stream of nitrogen gas to produce the desired boric acid ester compound.

When the compound represented by the general formula (1) or (2) is reacted with boron atom at a molar ratio of 3:1, a polyalkylene oxide boric acid triester is produced.

The proportion of the boric acid ester can be arbitrarily adjusted by the molar ratio of hydroxyl group and boron atom. The molar ratio of the compound represented by the general formula (1) or (2) and boron atom is preferably from 6/1 to 3/1. In the case where the compound represented by the general formula (1) or (2) has two or more hydroxyl groups, the progress of conversion to boric acid ester may be accompanied by the formation of network polymer that may not keep the reaction system fluidized. Therefore, any solvent which doesn't participate in the esterification reaction can be properly used.

The nitrile group-containing compound to be used in the invention can be obtained by adding acrylonitrile dropwise to a hydroxyl group-containing compound as a substrate of nitrile group-containing compound represented by the general formula (1) or (2) at a temperature of from 30° C. to 80° C. in a stream of inert gas. For example, to the hydroxyl group-containing compound may be added dropwise gradually acrylonitrile with stirring at a reaction temperature of from 30° C. to 80° C. in the presence of a catalytic amount of an alkali hydroxide in a stream of a proper amount of nitrogen gas. The mixture is then kept for 2 to 12 hours to cause cyanoethylation reaction that produces a nitrile group-containing compound.

The order of the aforementioned alkyletherification reaction and cyanoethylation reaction is arbitrary.

The compound represented by the general formula (2) or (4) to be used in the invention can be obtained by the esterification of an alkylene oxide derivative with an organic acid having a polymerizable group or the ring opening polymerization of an organic acid having a polymerizable group with an alkylene oxide. For example, an alkylene oxide derivative may be reacted with an organic acid having a polymerizable group at a predetermined molar ratio in the presence of an esterification catalyst which has heretofore been known to obtain the compound represented by the general formula (2) or (4). Alternatively, an organic acid having a polymerizable group may be polymerized with an alkylene oxide such as ethylene oxide, propylene oxide, butylene oxide and tetrahydrofurane at a predetermined molar ratio in the presence of a ring opening polymerization catalyst which has heretofore been known to obtain the compound represented by the general formula (2) or (4).

The compounds represented by the general formula (2) or (4) maybe used singly or in combination of two or more thereof.

The polymerizable group contained in the compound represented by the general formula (2) or (4) to be used in the invention is polymerized before the use of the compound. The polymerization of the polymerizable group is accomplished by the use of energy such as heat, ultraviolet ray, visible light and electron beam. The polymerization may be effected optionally in the presence of a polymerization initiator which has heretofore been known. The number-average molecular weight of the compound thus polymerized is preferably from 50,000 to 10,000,000. When the number-average molecular weight of the compound thus polymerized falls below 50,000, the flexibility characteristic to electrolyte for secondary battery can difficultly be obtained. On the contrary, when the number-average molecular weight of the compound thus polymerized exceeds 10,000,000, the resulting compound can prevent ionic conduction.

The boric acid ester compounds or nitrile group-containing compounds derived from the general formula (1) to be used in the invention may be used singly or in admixture preferably in an amount of from 5 to 95 parts by weight, more preferably from 10 to 80 parts by weight for the purpose of providing flexibility characteristic to polymer electrolyte.

The polymerization products of boric acid ester compound or nitrile group-containing compound derived from the general formula (2) to be used in the invention may be used singly or in admixture preferably in an amount of from 5 to 100 parts by weight, more preferably from 10 to 90 parts by weight for the purpose of providing good mechanical properties.

The electrolyte comprising a polymerization product of boric acid ester compound or nitrile group-containing compound derived from the general formula (2) has a boric acid ester or nitrile group fixed in the same molecule as polymer matrix and thus exhibits a high ionic conductivity as well as an excellent film stability. Further, since the boric acid ester or nitrile group is present in the same molecule, the electrolyte can be used free of third components other than ionic compound, making it easy to simplify the procedure of obtaining an electrolyte film to a great advantage. Moreover, the use of the compound represented by the general formula (2) as a substrate makes it possible to control arbitrarily the amount of polymerizable group, boric acid ester group and nitrile group to be incorporated to a great advantage from the standpoint of design of material.

The boric acid ester compounds or nitrile group-containing compounds derived from the general formula (1) to be used in the invention may be used singly or in admixture. These compounds are preferably used in admixture with the polymerization product of compound represented by the general formula (4) for the purpose of providing good mechanical properties and flexibility.

The boric acid ester compound or nitrile group-containing compound derived from the general formula (1) and the polymerization product of compound represented by the general formula (4) are preferably used at a weight ratio of from 10/90 to 95/5, more preferably from 20/80 to 80/20.

The boric acid ester compounds or nitrile group-containing compounds derived from the general formula (1) to be used in the invention maybe used singly or in admixture. These compounds are preferably used in admixture with the organic polymer compound represented by the general formula (6) as a matrix for the purpose of providing good mechanical properties and flexibility.

The boric acid ester compound or nitrile group-containing compound derived from the general formula (1) and the organic polymer compound represented by the general formula (6) are preferably used at a weight ratio of from 10/90 to 95/5, more preferably from 20/80 to 80/20.

The boric acid ester compounds or nitrile group-containing compounds derived from the general formula (1) to be used in the invention may be used singly or in admixture These compounds are preferably used in admixture with the boric acid ester compound or nitrile group-containing compound represented by the general formula (2), singly or in the form of polymerization product of mixture thereof, as a matrix for the purpose of providing good mechanical properties and flexibility.

The boric acid ester compound or nitrile group-containing compound derived from the general formula (1) and the polymerization product of boric acid ester compound or nitrile group-containing compound represented by the general formula (2) are preferably used at a weight ratio of from 5/95 to 90/10, more preferably from 10/90 to 80/20.

The polymerization products of boric acid ester compound or nitrile group-containing compound derived from the general formula (2) to be used in the invention may be used singly or in admixture. These polymerization products are preferably used in admixture with a polymerization product of compound represented by the general formula (4) for the purpose of providing good mechanical properties.

The polymerization product of boric acid ester compound or nitrile group-containing compound derived from the general formula (2) and the polymerization product of compound represented by the general formula (4) are preferably used at a weight ratio of 10/90 to 95/5, more preferably from 20/80 to 90/10.

The polymerization products of boric acid ester compound or nitrile group-containing compound derived from the general formula (2) to be used in the invention may be used singly or in admixture. These polymerization products are preferably used in admixture with the organic polymer compound represented by the general formula (6) for the purpose of providing good mechanical properties.

The polymerization product of boric acid ester compound derived from the general formula (2) and the organic polymer compound represented by the general formula (6) are preferably used at a weight ratio of from 10/90 to 95/5, more preferably from 20/80 to 90/10, The boric acid ester compounds or nitrile group-containing compounds derived from the general formula (1) to be used in the invention may be used singly or in admixture. These compounds are preferably used in admixture with the boric acid ester compounds or nitrile group-containing compounds derived from the general formula (2), singly or in the form of polymerization product of mixture thereof, and the polymerization product of compound represented by the general formula (4) for the purpose of providing good mechanical properties and flexibility.

The boric acid ester compound or nitrile group-containing compound derived from the general formula (1) and other components are preferably used at a weight ratio of from 10/90 to 95/5, more preferably from 20/80 to 80/20.

The boric acid ester compounds or nitrile group-containing compounds derived from the general formula (1) to be used in the invention may be used singly or in admixture. These compounds are preferably used in admixture with the boric acid ester compounds or nitrile group-containing compounds derived from the general formula (2), singly or in the form of polymerization product of mixture thereof, and the organic polymer compound represented by the general formula (6) for the purpose of providing good mechanical properties and flexibility.

The boric acid ester compound or nitrile group-containing compound derived from the general formula (1) and other components are preferably used at a weight ratio of from 10/90 to 95/5, more preferably from 20/80 to 80/20.

The boric acid ester compounds or nitrile group-containing compounds derived from the general formula (1) to be used in the invention may be used singly or in admixture. These compounds are preferably used in admixture with the polymerization product of compound represented by the general formula (4), singly or in the form of polymerization product of mixture thereof, and the organic polymer compound represented by the general formula (6) for the purpose of providing good mechanical properties and flexibility.

The boric acid ester compound or nitrile group-containing compound derived from the general formula (1) and other components are preferably used at a weight ratio of from 10/90 to 95/5, more preferably from 20/80 to 80/20.

The boric acid ester compounds or nitrile group-containing compounds derived from the general formula (1) to be used in the invention may be used singly or in admixture. These compounds are preferably used in admixture with the boric acid ester compounds or nitrile group-containing compounds derived from the general formula (2), singly or in the form of polymerization product of mixture thereof, the polymerization product of compound represented by the general formula (4) and the organic polymer compound represented by the general formula (6) for the purpose of providing good mechanical properties and flexibility.

The boric acid ester compound or nitrile group-containing compound derived from the general formula (1) and other components are preferably used at a weight ratio of from 10/90 to 95/5, more preferably from 20/80 to 80/20.

The polymerization product of boric acid ester compound or nitrile group-containing compound derived from the general formula (2) to be used in the invention is preferably used in admixture with the boric acid ester compound or nitrile group-containing compound derived from the general formula (1) and the polymerization product of compound represented by the general formula (4) for the purpose of providing good mechanical properties and flexibility.

The polymerization product of boric acid ester compound or nitrile group-containing compound derived from the general formula (2) and the boric acid ester compound or nitrile group-containing compound derived from the general formula (1) and the polymerization product of compound represented by the general formula (4) are preferably used at a weight ratio of from 10/90 to 95/5, more preferably from 20/80 to 80/20.

The boric acid ester compound or nitrile group-containing compound derived from the general formula (2) to be used in the invention is preferably used in admixture with the boric acid ester compound or nitrile group-containing compound derived from the general formula (1), the polymerization product of compound represented by the general formula (4) and the organic polymer compound represented by the general formula (6) for the purpose of providing good mechanical properties and flexibility.

The polymerization product of boric acid ester compound or nitrile group-containing compound derived from the general formula (2) and the boric acid ester compound or nitrile group-containing compound derived from the general formula (1), the polymerization product of compound represented by the general formula (4) and the organic polymer compound represented by the general formula (6) are preferably used at a weight ratio of from 10/90 to 95/5, more preferably from 20/80 to 80/20.

The polymerization product of boric acid ester compound or nitrite group-containing compound derived from the general formula (2) to be used in the invention is preferably used in admixture with the polymerization product of compound represented by the general formula (4) and the organic polymer compound represented by the general formula (6) for the purpose of providing good mechanical properties.

The polymerization product of boric acid ester compound or nitrile group-containing compound derived from the general formula (2) and the polymerization product of compound represented by the general formula (4) and the organic polymer compound represented by the general formula (6) are preferably used at a weight ratio of from 10/90 to 95/5, more preferably from 20/80 to 90/10.

The ionic compound to be used in the invention may be incorporated in the organic polymer compound to be used in the invention in an arbitrary proportion. From the standpoint of contribution of drop of glass transition temperature of organic polymer compound to ionic conductivity, the ionic compound is preferably incorporated in the organic polymer compound in a proportion of 1 mol of alkaline metal per a total of from 2 to 30 mols, more preferably from 2 to 20 mols, even more preferably from 2 to 15 mols of oxyalkylene unit contained in the organic polymer compound to be used in the invention.

Examples of the ionic compound employable herein include alkaline metal salts such as $LiClO_4$, $LiAsF_6$, $LiPF_5$, $LiBF_4$, $LiCF_3SO_3$, $Li(CF_3SO_2)_2N$, $Li(C_2F_5SO_2)_2N$, $Li(CF_3SO_2)_3C$, LiI, LiSCN, NaBr, NaI, NaSCN, KI and KSCN. Preferred among these alkaline metal salts are lithium salts such as $LiClO_4$, $LiAsF_6$, $LiPF_6$, $LiBF_4$, $LiCF_3SO_3$, $Li(CF_3SO_2)_2N$, $Li(C_2F_5O_2)_2N$, $Li(CF_3SO_2)3C$, LiI and LiSCN.

Further, the electrolyte for secondary battery of the invention may comprise an ionically-conductive or ferroelectric salt, glass powder, etc. incorporated therein. Examples of such a salt or glass powder include $SnO_2$, $BaTiO_3$, $Al_2O_3$, $Li_2O·3B_2O_3$, and $LaTiO_3$.

The electrolyte for secondary battery of the invention can be prepared by various methods. The preparation method to be used herein is not specifically limited. By way of example, since the boric acid ester compound or nitrile group-containing compound derived from the general formula (1) to be used in the invention is dissolved in many low boiling organic solvents, a boric acid ester compound, a nitrile group-containing compound, polymerization products thereof, an organic polymer compound such as polymerizable organic compound, and an ionic compound are dissolved in a low boiling solvent to prepare a solution. The solution thus prepared is then subjected to casting under heating. The solution thus casted is then subjected to heat polymerization of the polymerizable organic polymer compound while the low boiling solvent is being removed to obtain a thin film of polymer electrolyte having a mechanical strength. If necessary, the solution thus casted can be irradiated with an electromagnetic wave such as ultraviolet ray, visible light and electron beam so that the polymerizable organic compound under goes polymerization to obtain a thin film. Alternatively, a thin film of polymer electrolyte can be obtained by a process which comprises dissolving the boric acid ester compound or nitrile group-containing compound derived from the general formula (1) or (2) of the invention, the ionic compound and the polymer compound represented by the general formula (6) in a low boiling solvent to prepare a solution, casting the solution under heating, and then subjecting the solution thus casted to heat polymerization while removing the low boiling solvent. More alternatively, a thin film of polymer electrolyte can be obtained by a process which comprises dissolving the polymerization product of boric acid ester compound or nitrile group-containing compound derived from the general formula (2), the ionic compound and the polymerization product of compound represented by the general formula (4) in a low boiling solvent to prepare a solution, and then casting the solution under heating to remove the low boiling solvent or thoroughly kneading the various polymerization products and the ionic compound.

The organic polymer compound may be used in admixture with other organic polymer compounds so far as the effect of the invention cannot be impaired. Examples of the other organic polymer compounds include polyacrylonitrile, acrylonitrile-methacrylic acid copolymer, acrylonitrile-methyl methacrylate copolymer, methacrylic acid-styrene-methacrylic acid copolymer, acrylonitrile-styrene-methyl methacrylate copolymer, and styrene-maleic acid copolymer. However, the invention is not limited to these organic polymer compounds.

By way of example, a thin film of polymer gel electrolyte can be obtained by a process which comprises dissolving a boric acid ester compound, a nitrile group-containing compound, a polymerization product thereof, an organic polymer compound such as polymerizable organic compound, and an ionic compound in a low boiling solvent to prepare a solution, adding an organic solvent which can act as a plasticizer to the solution to prepare a solution, and then casting the solution under heating so that the polymerizable organic compound undergoes heat polymerization while removing the low boiling solvent. Alternatively, a thin film of polymer gel electrolyte can be obtained by a process which comprises dissolving a polymerizable organic compound represented by the general formula (2) or (4) of the invention or a boric acid ester compound or nitrile group-containing compound derived from the general formula (1) in a low boiling solvent to prepare a solution, casting the solution under heating so that the polymerizable organic compound undergoes heat polymerization while removing the low boiling solvent to obtain a thin film of polymer solid, and then impregnating the thin film with an organic solvent having an ionic compound dissolved therein. If necessary, the solution thus casted may be irradiated with an electromagnetic wave such as ultraviolet ray, visible light and electron beam so that the polymerizable organic compound undergoes polymerization to obtain a thin film.

The electrolyte for secondary battery of the invention can be combined with a cathode sheet and an anode material which have heretofore been known to obtain a secondary battery having excellent ionic conductivity, cycle life performance and safety.

EXAMPLE

The invention will be further described in the following examples.

The term "LiTFSI" as used hereinafter is meant to indicate lithium bis(trifluoromethanesulfonate)imide.

In the following examples and comparative examples except Comparative Example 3, preparation was made such that the amount of alkaline metal contained in the ionic compound is 1 mol per 8 mols of oxyethylene unit contained in the boric acid ester compound, nitrile group-containing compound and compound represented by the general formula (2) or (4).

Preparation Example 1-1

To 550 g (1.0 mol) of a methoxy polyethylene glycol having a molecular weight of 550 as a starting material were added 11.6 g (0.167 mols) of boric anhydride. The mixture was then heated to a temperature of 110° C. in an atmosphere of nitrogen gas. After reaching 110° C., the pressure in the system was then gradually reduced. The interior of the reaction system was then kept at a pressure of not higher than 2.67 kPa (20 mmHg) for 3 hours. With the progress of reaction, the resulting water was removed. The reaction solution was then filtered to obtain a boric acid ester compound (1-1).

Preparation Example 1-2

To 600 g (1.0 mol) of a polyethylene glycol having a molecular weight of 600 as a starting material were added 600 ml of toluene as a reaction solvent. To the mixture were then added 23.2 g (0.333 mols) of boric anhydride. The mixture was then heated to a temperature of 110° C. in an atmosphere of nitrogen gas. The reaction system had been equipped with a reflux condenser and a moisture receiver so that toluene thus vaporized can be refluxed and the resulting water can be separated from toluene by the difference in specific gravity from toluene. After reaching 110° C., the pressure in the system was then gradually reduced. The interior of the reaction system was then kept at a pressure of not higher than 2.67 kPa (20 mmHg) for 3 hours. With the progress of reaction, the resulting water was removed. The toluene solution of boric acid ester compound thus obtained was filtered, and then put in a stainless steel pan. The stainless steel pan was then kept at a temperature of 120° C. and a pressure of not higher than 1.33 kPa (10 mmHg) in a vacuum oven for 12 hours to distill off toluene. Thus, a boric acid ester compound (1-2) was obtained.

Preparation Example 1-3

To 750 g (1.0 mol) of a tris(polyethylene glycol)glycerol ether having a molecular weight of 750 as a starting material were added 600 ml of toluene as a reaction solvent. To the mixture were then added 34.8 g (0.5 mols) of boric anhydride. The mixture was then heated to a temperature of 110° C. in an atmosphere of nitrogen gas. The reaction system had been equipped with a reflux condenser and a moisture receiver so that toluene thus vaporized can be refluxed and the resulting water can be separated from toluene by the difference in specific gravity from toluene. After reaching 110° C., the pressure in the system was then gradually reduced. The interior of the reaction system was then kept at a pressure of not higher than 2.67 kPa (20 mmHg) for 3 hours. with the progress of reaction, the resulting water was removed. The toluene solution of boric acid ester compound thus obtained was filtered, and then put in a stainless steel pan. The stainless steel pan was then kept at a temperature of 120° C. and a pressure of not higher than 1.33 kPa (10 mmHg) in a vacuum oven for 12 hours to distill off toluene. Thus, a boric acid ester compound (1-3) was obtained.

Preparation Example 1-4

To 1,000 g (1.0 mol) of a tetrakis (polyethylene glycol) pentaerythritol ether having a molecular weight of 1,000 as a starting material were added 600 ml of toluene as a reaction solvent. To the mixture were then added 46.4 g (0.67 mols) of boric anhydride. The mixture was then heated to a temperature of 110° C. in an atmosphere of nitrogen gas. The reaction system had been equipped with a reflux condenser and a moisture receiver so that toluene thus vaporized can be refluxed and the resulting water can be separated from toluene by the difference in specific gravity from toluene. After reaching 110° C., the pressure in the system was then gradually reduced. The interior of the reaction system was then kept at a pressure of not higher than 2.67 kPa (20 mmHg) for 3 hours. With the progress of reaction, the resulting water was removed. The toluene solution of boric acid ester compound thus obtained was filtered, and then put in a stainless steel pan. The stainless steel pan was then kept at a temperature of 120° C. and a pressure of not higher than 1.33 kPa (10 mmHg) in a vacuum oven for 12 hours to distill off toluene. Thus, a boric acid ester compound (1-4) was obtained.

Preparation Example 1-5

To 600 g (0.15 mols) of a methoxy polyethylene glycol having a molecular weight of 4,000 as a starting material were added 1.74 g (0.025 mols) of boric anhydride. The mixture was then heated to a temperature of 110° C. in an atmosphere of nitrogen gas. After reaching 110° C., the pressure in the system was then gradually reduced. The interior of the reaction system was then kept at a pressure of not higher than 2.67 kPa (20 mmHg) for 3 hours. With the progress of reaction, the resulting water was removed. There action solution was then filtered to obtain a boric acid ester compound (1-5).

Preparation Example 1-6

To 600 g (0.15 mols) of a methoxy polyethylene-propylene glycol (ethylene oxide/propylene oxide=50/50 (by weight)) having a molecular weight of 4,000 as a starting material were added 1.74 g (0.025 mols) of boric anhydride. The mixture was then heated to a temperature of 110° C. in an atmosphere of nitrogen gas. After reaching 110° C., the pressure in the system was then gradually reduced. The interior of the reaction system was then kept at a pressure of not higher than 2.67 kPa (20 mmHg) for 3 hours. With the progress of reaction, the resulting water was removed. There action solution was then filtered to obtain a boric acid ester compound (1-6).

Preparation Example 2-1

To 1,000 g (1.0 mol) of a polyethylene glycol having a molecular weight of 1,000 as a starting material were added 0.20 g of potassium hydroxide. The mixture was then heated to a temperature of 50° C. in an atmosphere of nitrogen gas. To the mixture were then added dropwise 111.3 g (2.10 mols) of acrylonitrile in 2 hours. After the termination of dropwise addition, the reaction solution was then kept at the same temperature for 2 hours to continue the reaction. Thereafter, the reaction solution was heated to a temperature of 110° C. The pressure in the reaction system was then gradually reduced. The interior of the reaction system was then kept at a pressure of not higher than 2.67 kPa (20 mmHg) for 1 hour. The unreacted acrylonitrile was then removed. Thereafter, the reaction solution was filtered to obtain a nitrile group-containing compound (2-1). The percent incorporation of cyanoethyl group in the compound (2-1) calculated from the change of hydroxyl value between before and after reaction was 92%.

Preparation Example 2-2

To 750 g (1.0 mol) of a tris(polyethylene glycol)glycerol ether having a molecular weight of 750 as a starting material were added 0.23 g of potassium hydroxide. The mixture was then heated to a temperature of 50° C. in an atmosphere of nitrogen gas. To the mixture were then added dropwise 167.0 g (3.15 mols) of acrylonitrile in 2 hours. After the termination of dropwise addition, the reaction solution was then kept at the same temperature for 2 hours to continue the reaction. Thereafter, the reaction solution was heated to a temperature of 110° C. The pressure in the reaction system was then gradually reduced. The interior of the reaction system was then kept at a pressure of not higher than 2.67 kPa (20 mmHg) for 1 hour. The unreacted acrylonitrile was then removed. Thereafter, the reaction solution was filtered to obtain a nitrile group-containing compound (2-2). The percent incorporation of cyanoethyl group in the compound (2-2) calculated from the change of hydroxyl value between before and after reaction was 93%.

Preparation Example 2-3

To 1,000 g (1.0 mol) of a tetrakis(polyethylene glycol) pentaerythritol ether having a molecular weight of 1,000 as a starting material were added 0.40 g of potassium hydroxide. The mixture was then heated to a temperature of 50° C. in an atmosphere of nitrogen gas. To the mixture were then added dropwise 222.6 g (4.20 mols) of acrylonitrile in 2 hours. After the termination of dropwise addition, the reaction solution was then kept at the same temperature for 2 hours to continue the reaction. Thereafter, the reaction solution was heated to a temperature of 110° C. The pressure in the reaction system was then gradually reduced. The interior of the reaction system was then kept at a pressure of not higher than 2.67 kPa (20 mmHg) for 1 hour. The unreacted acrylonitrile was then removed. Thereafter, the reaction solution was filtered to obtain a nitrile group-containing compound (2-3). The percent incorporation of cyanoethyl group in the compound (2-3) calculated from the change of hydroxyl value between before and after reaction was 92%.

Preparation Example 3-1

To 944 g (2.0 mols) of Blemmer Series AE-400 (produced by NOF CORP.) (polyethylene glycol (400) monoacrylate) and 550 g (1.0 mols) of a methoxy polyethylene glycol having a molecular weight of 550 as starting materials were added 34.8 g (0.5mols) of boric anhydride. The mixture was then heated to a temperature of 70° C. in an atmosphere of nitrogen gas. After reaching 70° C., the pressure in the system was then gradually reduced. The interior of the reaction system was then kept at a pressure of not higher than 2.67 kPa (20 mmHg) for 15 hours. With the progress of reaction, the resulting water was removed. The reaction solution was then filtered to obtain a boric acid ester compound (3-1).

Preparation Example 3-2

To 1,308 g (3.0 mols) of Blemmer Series PE-350 (produced by NOF CORP.) (polyethylene glycol (350) monomethacrylate) were added 34.8 g (0.5 mols) of boric anhydride. The mixture was then heated to a temperature of 70° C. in an atmosphere of nitroqen gas. After reaching 70° C., the pressure in the system was then gradually reduced. The interior of the reaction system was then kept at a pressure of not higher than 2.67 kPa (20 mmHg) for 15 hours. With the progress of reaction, the resulting water was removed. The reaction solution was then filtered to obtain a boric acid ester compound (3-2).

Preparation Example 4-1

To 472 g (1.0 mol) of Blemmer Series AE-400 (produced by NOF CORP.) (polyethylene glycol (400) monoacrylate) were added 0.09 g of potassium hydroxide. The mixture was then heated to a temperature of 50° C. in an atmosphere of nitrogen gas. To the mixture were then added dropwise 55.7 g (1.05 mols) of acrylonitrile in 2 hours. After the termination of dropwise addition, the reaction solution was then kept at the same temperature for 2 hours to continue the reaction. Thereafter, the reaction solution was heated to a temperature of 70° C. The pressure in the reaction system was then gradually reduced. The interior of the reaction system was then kept at a pressure of not higher than 2.67 kPa (20 mmHg) for 3 hours. The unreacted acrylonitrile was then removed. Thereafter, the reaction solution was filtered to obtain a nitrile group-containing compound (4-1). The percent incorporation of cyanoethyl group in the compound (4-1) calculated from the change of hydroxyl value between before and after reaction was 91%.

Preparation Example 4-2

To 436 g (1.0 mol) of Blemmer Series PE-350 (produced by NOF CORP.) (polyethylene glycol (350) monomethacrylate) were added 0.09 g of potassium hydroxide. The mixture was then heated to a temperature of 50° C. in an atmosphere of nitrogen gas. To the mixture were then added dropwise 55.7 g (1.05 mols) of acrylonitrile in 2 hours. After the termination of dropwise addition, the reaction solution was then kept at the same temperature for 2 hours to continue the reaction. Thereafter, the reaction solution was heated to a temperature of 70° C. The pressure in the reaction system was then gradually reduced. The interior of the reaction system was then kept at a pressure of not higher than 2.67 kPa (20 mmHg) for 3 hours. The unreacted acrylonitrile was then removed. Thereafter, the reaction solution was filtered to obtain a nitrile group-containing compound (4-2). The percent incorporation of cyanoethyl group in the compound (4-2) calculated from the change of hydroxyl value between before and after reaction was 91%.

Example 1

3.00 g of the boric acid ester compound (1-1) obtained in Preparation Example 1-1 were mixed with 2.00 g of Blemmer Series PE-350 (produced by NOF CORP.) (polyethyleneglycol (350) monomethacrylate). To the mixture were then added 3.98 g of LiTFSI as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Example 2

3.00 g of the boric acid ester compound (1-1) obtained in Preparation Example 1-1 were mixed with 2.00 g of Blemmer Series PDE-600 (produced by NOF CORP.) (polyethylene glycol (550) dimethacrylate). To the mixture were then added 3.59 g of LiTFSI as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Example 3

2.00 g of the boric acid ester compound (1-1) obtained in Preparation Example 1-1 were mixed with 3.00 g of Blemmer Series PME-400 (produced by NOF CORP.) (methoxypolyethylene glycol (400) methacrylate). To the mixture were then added 3.98 g of LiTFSI as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Example 4

3.50 g of the boric acid ester compound (1-1) obtained in Preparation Example 1-1 were mixed with 0.75 g of Blemmer Series PDE-600 (produced by NOF CORP.) (polyethylene glycol (550) dimethacrylate) and 0.75 g of Blemmer Series PME-400 (produced by NOF CORP.) (methoxypolyethylene glycol (400) methacrylate). To the mixture were then added 3.21 g of LiTFSI as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Example 5

3.00 g of the boric acid ester compound (1-1) obtained in Preparation Example 1-1 were mixed with 1.00 g of Blemmer Series PDE-600 (produced by NOF CORP.) (polyethylene glycol (550) dimethacrylate) and 1.00 g of Blemmer Series PME-400 (produced by NOF CORP.) (methoxypolyethylene glycol (400) methacrylate). To the mixture were then added 3.77 g of LiTFSI as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Example 6

3.00 g of the boric acid ester compound (1-1) obtained in Preparation Example 1-1 were mixed with 2.00 9 of Blemmer Series PE-350 (produced by NOF CORP.) (polyethylene glycol (350) monomethacrylate). To the mixture were then added 1.35 g of lithium perchlorate as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Example 7

3.00 g of the boric acid ester compound (1-1) obtained in Preparation Example 1-1 were mixed with 2.00 g of Blemmer Series PDE-600 (produced by NOF CORP.) (polyethylene glycol (550) dimethacrylate). To the mixture were then added 1.33 g of lithium perchlorate as a lithium salt to make a uniform solution. The solution thus prepared was then injected into a teflon boat, The solution was subjected to heat polymerization over a hot plate in an argon atmosphere, and then dried in vacuo to obtain an ionically-conductive polymer composition (polymer electrolyte) having a thickness of 0.50 mm .

Example 8

3.00 g of the boric acid ester compound (1-1) obtained in Preparation Example 1-1 were mixed with 2.00 g of Blemmer Series PME-400 (produced by NOF CORP.) (methoxypolyethylene glycol (400) methacrylate). To the mixture were then added 1.36 g of lithium perchlorate as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Example 9

3.00 g of the boric acid ester compound (1-1) obtained in Preparation Example 1-1 were mixed with 1.00 g of Blemmer Series PDE-600 (produced by NOF CORP.) (polyethylene glycol (550) dimethacrylate) and 1.00 g of Blemmer Series PME-400 (produced by NOF CORP.) (methoxypolyethylene glycol (4000) methacrylate). To the mixture were then added 1.40 g of lithium perchlorate as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Example 10

2.00 g of the boric acid ester compound (1-1) obtained in Preparation Example 1-1 were mixed with 2.00 g of a polyethylene oxide (480,000) produced by Wako Pure Chemical Industries, Ltd. To the mixture were then added 10.0 g of acetonitrile to make a solution. To the solution were then added 1.21 g of lithium perchlorate as a lithium salt to make a uniform solution. The solution thus prepared was then injected into a teflon boat. The solution was heated over a hot plate in an argon atmosphere, and then subjected to evaporation of solvent in vacuo to obtain an ionically-conductive polymer composition (polymer electrolyte) having a thickness of 0.50 mm.

Example 11

1.50 g of the boric acid ester compound (1-1) obtained in Preparation Example 1-1 were mixed with 3.00 g of a polyethylene oxide (480,000) produced by Wako Pure Chemical Industries, Ltd. To the mixture were then added 15.0 g of acetonitrile to make a solution. To the solution were then added 1.36 g of lithium perchlorate as a lithium salt to make a uniform solution. The solution thus prepared was then injected into a teflon boat. The solution was heated over a hot plate in an argon atmosphere, and then subjected to evaporation of solvent in vacuo to obtain an ionically-conductive polymer composition (polymer electrolyte) having a thickness of 0.50 mm.

Example 12

2.00 g of the boric acid ester compound (1-2) obtained in Preparation Example 1-2 were mixed with 2.00 g of a polyethylene oxide (480,000) produced by Wako Pure Chemical Industries, Ltd. To the mixture were then added 10.0 g of acetonitrile to make a solution. To the solution were then added 1.21 g of lithium perchlorate as a lithium salt to make a uniform solution. The solution thus prepared was then injected into a teflon boat. The solution was heated over a hot plate in an argon atmosphere, and then subjected to evaporation of solvent in vacuo to obtain an ionically-conductive polymer composition (polymer electrolyte) having a thickness of 0.50 mm.

Example 13

2.00 g of the boric acid ester compound (1-3) obtained in Preparation Example 1-3 were mixed with 2.00 g of a polyethylene oxide (480,000) produced by Wako Pure Chemical Industries, Ltd. To the mixture were then added 10.0 g of acetonitrile to make a solution. To the solution were then added 1.13 g of lithium perchlorate as a lithium salt to make a uniform solution. The solution thus prepared was then injected into a teflon boat. The solution was heated over a hot plate in an argon atmosphere, and then subjected to evaporation of solvent in vacuo to obtain an ionically-conductive polymer composition (polymer electrolyte) having a thickness of 0.50 mm.

Example 14

2.00 g of the boric acid ester compound (1-4) obtained in Preparation Example 1-4 were mixed with 2.00 g of a polyethylene oxide (480,000) produced by Wako Pure Chemical Industries, Ltd. To the mixture were then added 10.0 g of acetonitrile to make a solution. To the solution were then added 0.61 g of lithium perchlorate as a lithium salt to make a uniform solution. The solution thus prepared was then injected into a teflon boat. The solution was heated over a hot plate in an argon atmosphere, and then subjected to evaporation of solvent in vacuo to obtain an ionically-conductive polymer composition (polymer electrolyte) having a thickness of 0.50 mm.

Example 15

2.00 g of the boric acid ester compound (1-5) obtained in Preparation Example 1-5 were mixed with 2.00 g of a polyethylene oxide (480,000) produced by Wako Pure Chemical Industries, Ltd. To the mixture were then added 10.0 g of acetonitrile to make a solution. To the solution were then added 1.21 g of lithium perchlorate as a lithium salt to make a uniform solution. The solution thus prepared was then injected into a teflon boat. The solution was heated over a hot plate in an argon atmosphere, and then subjected to evaporation of solvent in vacuo to obtain an ionically-conductive polymer composition (polymer electrolyte) having a thickness of 0.50 mm.

Example 16

2.00 g of the boric acid ester compound (1-6) obtained in Preparation Example 1-6 were mixed with 2.00 g of a polyethylene oxide (480,000) produced by Wako Pure Chemical Industries, Ltd. To the mixture were then added 10.0 g of acetonitrile to make a solution. To the solution were then added 1.21 g of lithium perchlorate as a lithium salt to make a uniform solution. The solution thus prepared was then injected into a teflon boat. The solution was heated over a hot plate in an argon atmosphere, and then subjected to evaporation of solvent in vacuo to obtain an ionically-conductive polymer composition (polymer electrolyte) having a thickness of 0.50 mm.

Example 17

3.75 g of the nitrile group-containing compound (2-1) obtained in Preparation Example 2-1 were mixed with 1.25 g of Blemmer Series PDE-600 (produced by NOF CORP.) (polyethylene glycol (550) dimethacrylate). To the mixture were then added 3.48 g of LiTFSI as a lithium salt to make a uniform solution. The solution thus prepared was then injected into a teflon boat. The solution was subjected to heat polymerization at a temperature of 110° C. over a hot plate in an argon atmosphere, and then dried in vacuo to obtain an electrolyte for secondary battery having a thickness of 0.50 mm.

Example 18

3.75 g of the nitrile group-containing compound (2-2) obtained in Preparation Example 2-2 were mixed with 1.25 g of Blemmer Series PDE-600 (produced by NOF CORP.) (polyethylene glycol (550) dimethacrylate). To the mixture were then added 3.01 g of LiTFSI as a lithium salt to make a uniform solution. The solution thus prepared was then injected into a teflon boat. The solution was subjected to heat polymerization at a temperature of 110° C. over a hot plate in an argon atmosphere, and then dried in vacuo to obtain an electrolyte for secondary battery having a thickness of 0.50 mm.

Example 19

3.75 g of the nitrile group-containing compound (2-3) obtained in Preparation Example 2-3 were mixed with 1.25 g of Blemmer Series PDE-600 (produced by NOF CORP.) (polyethylene glycol (550) dimethacrylate). To the mixture were then added 2.97 g of LiTFSI as a lithium salt to make a uniform solution. The solution thus prepared was then injected into a teflon boat. The solution was subjected to heat polymerization at a temperature of 110° C. over a hot plate in an argon atmosphere, and then dried in vacuo to obtain an electrolyte for secondary battery having a thickness of 0.50 mm.

Example 20

1.25 g of the nitrile group-containing compound (2-2) obtained in Preparation Example 2-2 were mixed with 2.50 g of the boric acid ester compound (1-1) obtained in Preparation Example 1-1 and 1.25 g of Blemmer Series PDE-600 (produced by NOF CORP.) (polyethylene glycol (550) dimethacrylate). To the mixture were then added 3.45 g of LiTFSI as a lithium salt to make a uniform solution. The solution thus prepared was then injected into a teflon boat. The solution was subjected to heat polymerization at a temperature of 110° C. over a hot plate in an argon atmosphere, and then dried in vacuo to obtain an electrolyte for secondary battery having a thickness of 0.50 mm.

Example 21

3.75 g of the nitrile group-containing compound (2-2) obtained in Preparation Example 2-2 were mixed with 1.25 g of Blemmer Series PDE-600 (produced by NOF CORP.) (polyethylene glycol (550) dimethacrylate). To the mixture were then added 1.11 g of lithium perchlorate as a lithium salt to make a uniform solution. The solution thus prepared was then injected into a teflon boat. The solution was subjected to heat polymerization at a temperature of 110° C. over a hot plate in an argon atmosphere, and then dried in vacuo to obtain an electrolyte for secondary battery having a thickness of 0.50 mm.

Example 22

1.25 g of the nitrile group-containing compound (2-2) obtained in Preparation Example 2-2 were mixed with 2.50 g of the boric acid ester compound (1-1) obtained in Preparation Example 1-1 and 1.25 g of Blemmer series PDE-600 (produced by NOF CORP.) (polyethylene glycol (550) dimethacrylate). To the mixture were then added 1.27 g of lithium perchlorate as a lithium salt to make a uniform solution. The solution thus prepared was then injected into a teflon boat. The solution was subjected to heat polymerization at a temperature of 110° C. over a hot plate in an argon atmosphere, and then dried in vacuo to obtain an electrolyte for secondary battery having a thickness of 0.50 mm.

Example 23

To 4.00 g of the boric acid ester compound (3-1) obtained in Preparation Example 3-1 were added 2.67 g of LiTFSI as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Example 24

To 4.00 g of the boric acid ester compound (3-2) obtained in Preparation Example 3-2 were added 2.58 g of LiTFSI as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Example 25

To 4.00 g of the nitrile group-containing compound (4-1) obtained in Preparation Example 4-1 were added 2.46 g of LiTFSI as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Example 26

To 4.00 g of the nitrile group-containing compound (4-2) obtained in Preparation Example 4-2 were added 2.31 g of LiTFSI as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Example 27

2.00 g of the boric acid ester compound (1-1) obtained in Preparation Example 1-1 were mixed with 2.00 g of the boric acid ester compound (3-2) obtained in Preparation Example 3-2. To the mixture were then added 2.81 g of LiTFSI as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Example 28

2.00 g of the boric acid ester compound (1-1) obtained in Preparation Example 1-1 were mixed with 2.00 g of the nitrile group-containing compound obtained in Preparation Example 4-2. To the mixture were then added 2.67 g of LiTFSI as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Example 29

2.00 g of the nitrile group-containing compound (2-2) obtained in Preparation Example 2-2 were mixed with 2.00 g of the boric acid ester compound (3-2) obtained in Preparation Example 3-2. To the mixture were then added 2.47 g of LiTFSI as a lithium salt to make a uniform solution. The solution thus prepared was then injected into a teflon boat. The solution was subjected to heat polymerization over a hot plate in an argon atmosphere, and then dried in vacvo to obtain an ionically-conductive polymer composition (polymer electrolyte) having a thickness of 0.50 mm.

Example 30

2.00 g of the nitrile group-containing compound (2-2) obtained in Preparation Example 2-2 were mixed with 2.00 g of the nitrile group-containing compound (4-2) obtained in Preparation Example 4-2. To the mixture were then added 2.34 g of LiTFSI as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Example 31

3.20 g of the boric acid ester compound (3-2) obtained in Preparation Example 3-2 were mixed with 0.80 g of Blemmer Series PDE-600 (produced by NOF CORP.) (polyethylene glycol (550) dimethacrylate). To the mixture were then added 2.56 g of LiTFSI as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Example 32

3.20 g of the nitrile group-containing compound (4-2) obtained in Preparation Example 4-2 were mixed with 0.80 g of Blemmer Series PDE-600 (produced by NOF CORP.) (polyethylene glycol (550) dimethacrylate). To the mixture were then added 2.35 g of LiTFSI as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Example 33

2.00 g of the boric acid ester compound (3-2) obtained in Preparation Example 3-2 were mixed with 2.00 g of a polyethylene oxide (480,000) produced by Wako Pure Chemical Industries, Ltd. To the mixture were then added 2.92 g of LiTFSI as a lithium salt to make a solution. The solution were then added to 10.0 g of acetonitrile to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Example 34

2.00 g of the nitrile group-containing compound (4-2) obtained in Preparation Example 4-2 were mixed with 2.00 g of a polyethylene oxide (480,000) produced by Wako Pure Chemical Industries, Ltd. To the mixture were then added 2.79 g of LiTFST as a lithium salt to make a solution. The solution were then added to 10.0 g of acetonitrile to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Example 35

1.60 g of the boric acid ester compound (1-1) obtained in Preparation Example 1-1 were mixed with 1.60 g of the boric acid ester compound (3-2) obtained in Preparation Example 3-2 and 0.80 g of Blemmer Series PME-400 (produced by NOF CORP.) (methoxypolyethylene glycol (400) methacrylate). To the mixture were then added 2.88 g of LiTFSI as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Example 36

1.20 g of the boric acid ester compound (1-1) obtained in Preparation Example 1-1 were mixed with 1.20 g of the boric acid ester compound (3-2) obtained in Preparation Example 3-2 and 0.80 g of Blemmer Series PDE-600 (produced by NOF CORP.) (polyethylene glycol (550) dimethacrylate) and 0.80 g of a polyethylene oxide (480,000) produced by Wako Pure Chemical Industries, Ltd. The mixture was then added to 12.0 g of acetonitrile to make a solution. To the solution were then added 2.83 g of LiTFSI as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Comparative Example 1

To 4.00 g of Blemmer Series PE-350 (produced by NOF CORP.) (polyethylene glycol (350) monomethacrylate) were added 2.60 g of LiTPSI as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Comparative Example 2

To 4.00 g of a polyethylene glycol #4000 (molecular weight: 4,000) produced by NOF CORP. were added 3.26 g of LiTFSI as a lithium salt to make a uniform solution. The solution thus prepared was then injected into a teflon boat. The solution was heated over a hot plate in an argon atmosphere, and then subjected to evaporation of solvent in vacuo to obtain an ionically-conductive polymer composition (polymer electrolyte) having a thickness of 0.50 mm.

Comparative Example 3

4.00 g of a poly(acrylonitrile/methacrylic acid=93/7 (parts by weight) (molecular weight: 200,000; random copolymer) were dissolved in 10.0 g of dimethylformamide. To the solution were then added 3.73 g of lithium perchlorate as a lithium salt to make a uniform solution. The solution thus prepared was then injected into a teflon boat. The solution was heated over a hot plate in an argon atmosphere, and then subjected to evaporation of solvent in vacuo to obtain an ionically-conductive polymer composition (polymer electrolyte) having a thickness of 0.50 mm.

Comparative Example 4

To 4.00 g of Blemmer Series PME-400 (produced by NOF CORP.) (methoxypolyethylene glycol (400) methacrylate) were added 0.98 g of lithium perchlorate as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Comparative Example 5

To 4.00 g of Blemmer Series PDE-600 (produced by NOF CORP.) (polyethylene glycol (550) dimethacrylate) were added 0.81 g of lithium perchlorate as a lithium salt to make a uniform solution. The solution thus prepared was then injected into a teflon boat. The solution was subjected to heat polymerization over a hot plate in an argon atmosphere, and then dried in vacuo to obtain an ionically-conductive polymer composition (polymer electrolyte) having a thickness of 0.50 mm.

Comparative Example 6

LIPASTE EDEC ((1/1) mixture of ethylene carbonate/diethyl carbonate; lithium salt:lithium perchlorate; salt concentration: 1 mol/l) was used as an electrolyte.

Comparative Example 7

To 1.00 g of Blemmer Series PDE-600 (produced by NOF CORP.) (polyethylene glycol (550) dimethacrylate) were added 0.20 g of lithium perchlorate as a lithium salt. The mixture was then added 4 ml of LIPASTE EDEC ((1/1) mixture of ethylene carbonate/diethyl carbonate; lithium salt:lithium perchlorate; salt concentration: 1 mol/l) to make a uniform solution. To the solution thus prepared were then added 0.03 g of benzoin methyl ether. The solution was then injected into a teflon boat. The solution was then subjected to photopolymerization under a high voltage mercury vapor lamp obtain an ionically-conductive polymer composition (polymer electrolyte) having a thickness of 0.50 mm.

The polymer electrolytes obtained in these examples and comparative examples were each then evaluated for film-forming properties, film stability and ionic conductivity in the following manner.

(1) Film-forming Properties

G (good): A film can be obtained without any problem;

P (poor): Malcured or unable to form film (2) Film Stability

A specimen having an area of 900 mm$^2$ (30 mm×30 mm square) was punched out of the electrolyte film for secondary battery having a thickness of 0.5 mm was clamped between two sheets of transparent glass plates. The laminate was then allowed to stand at a temperature of 25° C. and 100° C. under a load of 500 g in an argon atmosphere for 30 days. The specimen was then evaluated for conditions of electrolyte film.

E (excellent): Little or no change from that at the beginning of test;

G (good): Film shape kept;

F (fair): The film is deformed or shown having a slight amount of component oozed out; and P (poor): The film is destroyed or shown having the component definitely oozed out (3) Ionic Conductivity The polymer electrolyte was clamped between two sheets of stainless steel electrodes. The laminate was then measured for a.c. complex impedance at various temperatures in an argon atmosphere. The diameter of the semicircle of bulk resistance component of plots (Cole-Cole plot) on the complex plane thus obtained was then measured to determine ionic conductivity.

Secondary batteries comprising these electrolytes were each then evaluated for charge and discharge performance in the following manner.

Example 38

75 parts by weight of a lithium manganate powder as a positive active material, 5 parts by weight of a polyvinylidene fluoride powder as a binder polymer and 20 parts by weight of a carbon powder as an electrically-conducting material were thoroughly kneaded. The mixture thus kneaded was then hot-pressed onto a copper foil to obtain a cathode sheet having a thickness of 0.10 mm and a diameter of 10 mm. As an alkaline metal ion-absorbing material there was used a metallic lithium foil having a thickness of about 0.08 mm and a diameter of 10 mm to form an anode material. A specimen having a diameter of 10 mm was then punched out of the polymer electrolyte of Example 4. The polymer electrolyte was then clamped between the aforementioned cathode sheet and the anode material. The laminate was then clamped between two sheets of stainless steel electrodes to obtain a secondary battery system.

The secondary battery thus obtained was charged at a temperature of 50° C. and a current density of 155 mA/m$^2$ to 4.35 V, and then discharged at a current density of 155 mA/m$^2$ to 3.50 V. This procedure was effected over 30 cycles. The secondary battery was measured for discharge capacity per kg of cathode active material at 1st cycle, 15th cycle and 30th cycle.

Comparative Example 8

The electrolyte of Comparative Example 6 was packed in a sealable cell having a porous polytetrafluoroethylene separator having a thickness of 0.05 mm clamped therein. The sealable cell was then clamped between the aforementioned cathode sheet and anode material. The laminate was then clamped between two sheets of stainless steel electrodes to obtain a secondary battery system. The secondary battery thus obtained was then evaluated in the same manner as in Example 38.

Example 39

75 parts by weight of a lithium manganate powder as a positive active material, 5 parts by weight of a polyvinylidene fluoride powder as a binder polymer and 20 parts by weight of a carbon powder as an electrically-conducting material were thoroughly kneaded. The mixture thus kneaded was then hot-pressed onto a copper foil to obtain a cathode sheet having a thickness of 0.10 mm and a diameter of 10 mm. As an alkaline metal ion-absorbing material there was used a metallic lithium foil having a thickness of about 0.08 mm and a diameter of 10 mm to form an anode material. A specimen having a diameter of 10 mm was then punched out of the polymer electrolyte of Example 20. The polymer electrolyte was then clamped between the aforementioned cathode sheet and the anode material. The laminate was then clamped between two sheets of stainless steel electrodes to obtain a secondary battery system.

The secondary battery thus obtained was charged at a temperature of 50° C. and a current density of 200 mA/m$^2$ to 4.35 V, and then discharged at a current density of 220 MA/m$^2$ to 3.50 V. This procedure was effected over 30 cycles. The secondary battery was measured for discharge capacity per kg of cathode active material at 1st cycle, 15th cycle, 30th cycle and 50th cycle.

Example 40

A specimen having a diameter of 10 mm was punched out of the polymer electrolyte of Example 23. The polymer electrolyte was then clamped between the aforementioned cathode sheet and anode material. The laminate was then clamped between two sheets of stainless steel electrodes to obtain a secondary battery system. The secondary battery was then evaluated in the same manner as in Example 39.

Example 41

A specimen having a diameter of 10 mm was punched out of the polymer electrolyte of Example 26. The polymer electrolyte was then clamped between the aforementioned cathode sheet and anode material. The laminate was then clamped between two sheets of stainless steel electrodes to obtain a secondary battery system. The secondary battery was then evaluated in the same manner as in Example 39.

Comparative Example 9

The electrolyte of Comparative Example 6 was packed in a sealable cell having a porous polytetrafluoroethylene separator having a thickness of 0.50 mm clamped therein. The laminate was clamped between the aforementioned cathode sheet and anode material. The laminate was then clamped between two sheets of stainless steel electrodes to obtain a secondary battery system. The secondary battery was then evaluated in the same manner as in Example 39.

The formulation of the boric acid ester compounds and nitrile group-containing compounds obtained in the preparation examples are set forth in Table 1. The formulation of the electrolytes obtained in the examples and comparative examples and the kind of the ionic compounds used in the examples and comparative examples are set forth in Table 2. The results of evaluatation of film-forming properties and ionic conductivity at 25° C., 50° C. and 80° C. of these examples and comparative examples are set forth in Table 3. The results of evaluation of film stability at 25° C. and 100° C. of these examples and comparative examples are set forth in Table 4. The results of evaluation of charge and discharge performance test on these examples and comparative examples are set forth in Table 5.

TABLE 1-1

| Preparation Example Nos. | Compound represented by the general formula (1) | Mols | Boric anhydride (mols) | Molar ratio of hydroxyl group to boron atom |
|---|---|---|---|---|
| 1-1 | $CH_3O(CH_2CH_2O)_{11.7}H$ | 1.0 | 0.167 | 3.0 |
| 1-2 | $HO(CH_2CH_2O)_{13.2}H$ | 1.0 | 0.333 | 3.0 |
| 1-3 | $CH_2\text{—}(OCH_2CH_2)_{4.8}\text{—}OH$<br>$\mid$<br>$CH_2\text{—}(OCH_2CH_2)_{4.8}\text{—}OH$<br>$\mid$<br>$CH_2\text{—}(OCH_2CH_2)_{4.8}\text{—}OH$ | 1.0 | 0.5 | 3.0 |
| 1-4 | $HO\text{—}(CH_2CH_2O)_{5.1}\text{—}C(\text{—}CH_2\text{—}(OCH_2CH_2)_{5.1}\text{—}OH)_3$ | 1.0 | 0.67 | 3.0 |
| 1-5 | $CH_3O(CH_2CH_2O)_{90.1}H$ | 0.15 | 0.025 | 3.0 |
| 1-6 | $CH_3O\text{—}(CH_2CH_2O)_{45.1}(CH_2CHO)_{34.2}\text{—}H$<br>$\qquad\qquad\qquad\qquad\qquad\mid$<br>$\qquad\qquad\qquad\qquad\quad CH_3$ | 0.15 | 0.025 | 3.0 |

TABLE 1-2

| Preparation Example Nos. | Compound represented by the general formula (1) | Mols | Acrylonitrile (mols) | Molar ratio of acrylonitrile to hydroxyl group |
|---|---|---|---|---|
| 2-1 | $HO(CH_2CH_2O)_{22}H$ | 1.0 | 2.1 | 1.05 |
| 2-2 | $CH_2\text{—}(OCH_2CH_2)_5\text{—}OH$<br>$\mid$<br>$CH_2\text{—}(OCH_2CH_2)_5\text{—}OH$<br>$\mid$<br>$CH_2\text{—}(OCH_2CH_2)_5\text{—}OH$ | 1.0 | 3.15 | 1.05 |
| 2-3 | $HO\text{—}(CH_2CH_2O)_{4.9}\text{—}CH_2\text{—}C(\text{—}CH_2\text{—}(OCH_2CH_2)_{4.9}\text{—}OH)_3$ | 1.0 | 4.20 | 1.05 |

| Preparation Example Nos. | Compound represented by the general formula (2) | Mols | Boric hydride (mols) | Molar ratio of hydroxyl group to boron atom |
|---|---|---|---|---|
| 3-1 | $CH_2{=}CH\text{—}CO\text{—}(OCH_2CH_2)_{9.1}\text{—}OH/$<br>$CH_3\text{—}(OCH_2CH_2)_{11.7}\text{—}OH$ | 2.0/<br>1.0 | 0.5 | 3.0 |
| 3-2 | $\qquad CH_3$<br>$\qquad\mid$<br>$CH_2{=}C\text{—}CO\text{—}(OCH_2CH_2)_{7.9}\text{—}OH$ | 3.0 | 0.5 | 3.0 |

| Preparation Example Nos. | Compound represented by the general formula (2) | Mols | Acrylonitrile (mols) | Molar ratio of acrylonitrile to hydroxyl group |
|---|---|---|---|---|
| 4-1 | $CH_2{=}CH\text{—}CO\text{—}(OCH_2CH_2)_{9.1}\text{—}OH$ | 1.0 | 1.05 | 1.05 |
| 4-2 | $\qquad CH_3$<br>$\qquad\mid$<br>$CH_2{=}C\text{—}CO\text{—}(OCH_2CH_2)_{7.9}\text{—}OH$ | 1.0 | 1.05 | 1.05 |

TABLE 2

| No. | | Boric acid ester compound or nitrile group-containing compound | Compound represented by the general formula (4) or (6) | Ratio of boric acid ester compound/nitrile group-containing compound/compound represented by the general formula (4) or (6) (by weight) | Number-average molecular weight of polymerization product of compound represented by the general formula (2) or (4) or compound represented by the general formula (6) | Ionic compound |
|---|---|---|---|---|---|---|
| Example | 1 | Preparation Example 1-1 | MAA-(EO)$_{7.9}$-H | 60/0/40 | 180,000 | LiTFSI |
| | 2 | Preparation Example 1-1 | MAA-(EO)$_{12.5}$-MAA | 60/0/40 | 1,800,000 | LiTFSI |
| | 3 | Preparation Example 1-1 | MAA-(EO)$_{8.9}$-CH3 | 40/0/60 | 210,000 | LiTFSI |
| | 4 | Preparation Example 1-1 | MAA-(EO)$_{12.5}$-MAA/MAA-(EO)$_{89}$-CH$_3$ | 70/0/(15/15) | 1,400,000 | LiTFSI |
| | 5 | Preparation Example 1-1 | MAA-(EO)$_{12.5}$-MAA/MAA-(EO)$_{89}$-CH$_3$ | 60/0/(20/20) | 1,400,000 | LiTFSI |
| | 6 | Preparation Example 1-1 | MAA-(EO)$_{7.9}$-H | 60/0/40 | 180,000 | LiClO$_4$ |
| | 7 | Preparation Example 1-1 | MAA-(EO)$_{12.5}$-MAA | 60/0/40 | 1,800,000 | LiClO$_4$ |
| | 8 | Preparation Example 1-1 | MAA-(EO)$_{7.9}$-CH$_3$ | 60/0/40 | 210,000 | LiClO$_4$ |
| | 9 | Preparation Example 1-1 | MAA-(EO)$_{12.5}$-MAA/MAA-(EO)$_{89}$-CH$_3$ | 60/0/(20/20) | 1,400,000 | LiClO$_4$ |
| | 10 | Preparation Example 1-1 | HO-(EO)$_{11000}$-H | 50/0/50 | 480,000 | LiClO$_4$ |
| | 11 | Preparation Example 1-1 | HO-(EO)$_{11000}$-H | 33/0/67 | 480,000 | LiClO$_4$ |
| | 12 | Preparation Example 1-2 | HO-(EO)$_{11000}$-H | 50/0/50 | 480,000 | LiClO$_4$ |
| | 13 | Preparation Example 1-3 | HO-(EO)$_{11000}$-H | 50/0/50 | 480,000 | LiClO$_4$ |
| | 14 | Preparation Example 1-4 | HO-(EO)$_{11000}$-H | 50/0/50 | 480,000 | LiClO$_4$ |
| | 15 | Preparation Example 1-5 | HO-(EO)$_{11000}$-H | 50/0/50 | 480,000 | LiClO$_4$ |
| | 16 | Preparation Example 1-6 | HO-(EO)$_{11000}$-H | 50/0/50 | 480,000 | LiClO$_4$ |
| | 17 | Preparation Example 2-1 | MAA-(EO)$_{12.5}$-MAA | 0/75/25 | 1,800,000 | LiTFSI |
| | 18 | Preparation Example 2-2 | MAA-(EO)$_{12.5}$-MAA | 0/75/25 | 1,800,000 | LiTFSI |
| | 19 | Preparation Example 2-3 | MAA-(EO)$_{12.5}$-MAA | 0/75/25 | 1,800,000 | LiTFSI |
| | 20 | Preparation Example 1-1/ Preparation Example 2-2 | MAA-(EO)$_{12.5}$-MAA | 50/25/25 | 1,600,000 | LiTFSI |
| | 21 | Preparation Example 2-2 | MAA-(EO)$_{12.5}$-MAA | 0/75/25 | 1,800,000 | LiClO$_4$ |
| | 22 | Preparation Example 1-1/ Preparation Example 2-2 | MAA-(EO)$_{12.5}$-MAA | 50/25/25 | 1,600,000 | LiClO$_4$ |
| | 23 | Preparation Example 3-1 | None | 100/0/0 | 1,200,000 | LiTFSI |
| | 24 | Preparation Example 3-2 | None | 100/0/0 | 1,800,000 | LiTFSI |
| | 25 | Preparation Example 4-1 | None | 0/100/0 | 1,600,000 | LiTFSI |
| | 26 | Preparation Example 4-2 | None | 0/100/0 | 1,500,000 | LiTFSI |
| | 27 | Preparation Example 1-1/ Preparation Example 3-2 | None | (50/50)/0/0 | 1,800,000 | LiTFSI |
| | 28 | Preparation Example 1-1/ Preparation Example 4-2 | None | 50/50/0 | 1,500,000 | LiTFSI |
| | 29 | Preparation Example 2-2/ Preparation Example 3-2 | None | 50/50/0 | 1,800,000 | LiTFSI |
| | 30 | Preparation Example 2-2/ | None | 0/(50/50)/0 | 1,500,000 | LiTFSI |

TABLE 2-continued

| No. | Boric acid ester compound or nitrile group-containing compound | Compound represented by the general formula (4) or (6) | Ratio of boric acid ester compound/nitrile group-containing compound/compound represented by the general formula (4) or (6) (by weight) | Number-average molecular weight of polymerization product of compound represented by the general formula (2) or (4) or compound represented by the general formula (6) | Ionic compound |
|---|---|---|---|---|---|
| 31 | Preparation Example 4-2 / Preparation Example 3-2 | MAA-(EO)$_{12.5}$-MAA | 80/0/20 | 2,200,000 | LiTFSI |
| 32 | Preparation Example 3-2 | MAA-(EO)$_{12.5}$-MAA | 0/80/20 | 2,000,000 | LiTFSI |
| 33 | Preparation Example 4-2 | HO-(EO)$_{11000}$-H | 50/0/50 | 1,800,000/480,000*[2] | LiTFSI |
| 34 | Preparation Example 3-2 | HO-(EO)$_{11000}$-H | 0/50/50 | 1,500,000/480,000*[2] | LiTFSI |
| 35 | Preparation Example 4-2 | MAA-(EO)$_{89}$-CH$_3$ | (40/40)/0/20 | 1,600,000 | LiTFSI |
| 36 | Preparation Example 1-1/ Preparation Example 3-2 | MAA-(EO)$_{12.5}$-MAA/ HO-(EO)$_{11000}$-H | (30/30)/0/(20/20) | 1,800,000/480,000*[2] | LiTFSI |
| 37 | Preparation Example 1-1/ Preparation Example 3-2 | MAA-(EO)$_{12.5}$-MAA/ HO-(EO)$_{11000}$-H | 60/0/(20/20) | 2,200,000/480,000*[2] | LiTFSI |
| Comparative Example 1 | | MAA-(EO)$_{7.9}$-H | | 180,000 | LiTFSI |
| 2 | | HO-(EO)$_{89}$-H | | 4,000 | LiTFSI |
| 3 | | Poly(acrylonitrile/methacrylic acid = 93/7)*[1] | | 200,000 | LiClO$_4$ |
| 4 | | MAA-(EO)$_{8.9}$-CH$_3$ | | 210,000 | LiClO$_4$ |
| 5 | | MAA-(EO)$_{8.0}$-MAA | | 2,000,000 | LiClO$_4$ |

*MAA stands for methacrylic acid or methacrylic acid residue. EO stands for oxyethylene group.
*[1]Molecular weight: 200,000; 93/7 (by weight) random copolymer
*[2]Number-average molecular weight of product of polymerization of copolymer derived from the general formula (1) with compound of the general formula (4)/compound of the general formula (6)

TABLE 3-1

| | | Film-forming properties | Conductivity (S/m) | | |
|---|---|---|---|---|---|
| | | | 25° C. | 50° C. | 80° C. |
| Example Nos. | 1 | G | $4.17 \times 10^{-3}$ | $3.01 \times 10^{-2}$ | $1.51 \times 10^{-1}$ |
| | 2 | G | $3.45 \times 10^{-3}$ | $2.54 \times 10^{-2}$ | $1.28 \times 10^{-1}$ |
| | 3 | G | $3.27 \times 10^{-3}$ | $2.34 \times 10^{-2}$ | $1.18 \times 10^{-1}$ |
| | 4 | G | $6.75 \times 10^{-3}$ | $5.64 \times 10^{-2}$ | $3.04 \times 10^{-1}$ |
| | 5 | G | $5.73 \times 10^{-3}$ | $4.14 \times 10^{-3}$ | $2.03 \times 10^{-1}$ |
| | 6 | G | $7.31 \times 10^{-4}$ | $7.88 \times 10^{-3}$ | $6.20 \times 10^{-2}$ |
| | 7 | G | $7.12 \times 10^{-4}$ | $6.06 \times 10^{-3}$ | $4.21 \times 10^{-2}$ |
| | 8 | G | $5.85 \times 10^{-3}$ | $7.09 \times 10^{-3}$ | $5.32 \times 10^{-2}$ |
| | 9 | G | $1.08 \times 10^{-3}$ | $1.31 \times 10^{-2}$ | $1.00 \times 10^{-1}$ |
| | 10 | G | $1.93 \times 10^{-3}$ | $1.66 \times 10^{-2}$ | $1.08 \times 10^{-1}$ |
| | 11 | G | $1.43 \times 10^{-3}$ | $1.20 \times 10^{-2}$ | $7.67 \times 10^{-2}$ |
| | 12 | G | $9.37 \times 10^{-4}$ | $1.04 \times 10^{-2}$ | $7.20 \times 10^{-2}$ |
| | 13 | G | $1.14 \times 10^{-3}$ | $1.00 \times 10^{-2}$ | $6.41 \times 10^{-2}$ |
| | 14 | G | $8.89 \times 10^{-4}$ | $1.03 \times 10^{-2}$ | $8.51 \times 10^{-2}$ |
| | 15 | G | $1.38 \times 10^{-3}$ | $1.33 \times 10^{-2}$ | $1.01 \times 10^{-2}$ |
| | 16 | G | $1.68 \times 10^{-3}$ | $1.58 \times 10^{-2}$ | $1.01 \times 10^{-1}$ |
| | 17 | G | $4.32 \times 10^{-3}$ | $4.70 \times 10^{-2}$ | $2.72 \times 10^{-1}$ |
| | 18 | G | $6.82 \times 10^{-3}$ | $5.12 \times 10^{-2}$ | $3.03 \times 10^{-1}$ |
| | 19 | G | $7.04 \times 10^{-3}$ | $5.38 \times 10^{-2}$ | $3.14 \times 10^{-1}$ |
| | 20 | G | $5.28 \times 10^{-3}$ | $4.16 \times 10^{-2}$ | $2.29 \times 10^{-1}$ |

TABLE 3-2

| | | Film-forming properties | Conductivity (S/m) | | |
|---|---|---|---|---|---|
| | | | 25° C. | 50° C. | 80° C. |
| Example Nos. | 21 | G | $8.02 \times 10^{-4}$ | $1.47 \times 10^{-2}$ | $1.40 \times 10^{-1}$ |
| | 22 | G | $5.93 \times 10^{-4}$ | $1.05 \times 10^{-2}$ | $8.85 \times 10^{-2}$ |
| | 23 | G | $3.65 \times 10^{-3}$ | $3.34 \times 10^{-2}$ | $2.01 \times 10^{-1}$ |
| | 24 | G | $2.50 \times 10^{-3}$ | $2.12 \times 10^{-2}$ | $1.21 \times 10^{-1}$ |
| | 25 | G | $6.36 \times 10^{-4}$ | $5.58 \times 10^{-3}$ | $2.96 \times 10^{-2}$ |
| | 26 | G | $8.95 \times 10^{-4}$ | $9.42 \times 10^{-3}$ | $6.56 \times 10^{-2}$ |
| | 27 | G | $2.01 \times 10^{-3}$ | $2.06 \times 10^{-2}$ | $1.66 \times 10^{-1}$ |
| | 28 | G | $3.05 \times 10^{-3}$ | $2.88 \times 10^{-2}$ | $2.09 \times 10^{-1}$ |
| | 29 | G | $1.97 \times 10^{-3}$ | $1.88 \times 10^{-2}$ | $1.31 \times 10^{-1}$ |
| | 30 | G | $1.33 \times 10^{-3}$ | $1.41 \times 10^{-2}$ | $6.73 \times 10^{-2}$ |
| | 31 | G | $1.20 \times 10^{-3}$ | $1.30 \times 10^{-2}$ | $1.06 \times 10^{-1}$ |
| | 32 | G | $8.10 \times 10^{-4}$ | $8.24 \times 10^{-2}$ | $2.99 \times 10^{-2}$ |
| | 33 | G | $6.88 \times 10^{-4}$ | $7.82 \times 10^{-3}$ | $1.55 \times 10^{-2}$ |
| | 34 | G | $5.10 \times 10^{-4}$ | $6.20 \times 10^{-2}$ | $1.01 \times 10^{-1}$ |
| | 35 | G | $3.06 \times 10^{-3}$ | $3.12 \times 10^{-2}$ | $2.41 \times 10^{-1}$ |
| | 36 | G | $3.85 \times 10^{-3}$ | $3.29 \times 10^{-2}$ | $2.42 \times 10^{-1}$ |
| | 37 | G | $3.68 \times 10^{-3}$ | $3.13 \times 10^{-2}$ | $2.22 \times 10^{-1}$ |
| Comparative Example Nos. | 1 | G | $2.31 \times 10^{-7}$ | $1.62 \times 10^{-5}$ | $5.75 \times 10^{-4}$ |
| | 2 | P | $2.20 \times 10^{-3}$ | $1.80 \times 10^{-2}$ | $8.50 \times 10^{-2}$ |
| | 3 | G | $1.22 \times 10^{-4}$ | $1.66 \times 10^{-3}$ | $1.96 \times 10^{-7}$ |
| | 4 | G | $1.33 \times 10^{-4}$ | $1.96 \times 10^{-3}$ | $1.99 \times 10^{-2}$ |
| | 5 | G | $9.74 \times 10^{-8}$ | $3.52 \times 10^{-6}$ | $1.33 \times 10^{-4}$ |

TABLE 4

| | Film stability | |
| --- | --- | --- |
| | 25° C. | 100° C. |
| Example 4 | G | G |
| Example 18 | G | G |
| Example 23 | E | E |
| Example 25 | E | E |
| Example 28 | E | E |
| Example 29 | E | E |
| Example 31 | E | E |
| Example 34 | E | E |
| Example 37 | E | E |
| Comparative Example 7 | F | F |

TABLE 5

| | Capacity (Ah/kg) | | | |
| --- | --- | --- | --- | --- |
| | 1st cycle | 15th cycle | 30th cycle | 50th cycle |
| Example 38 | 70 | 80 | 76 | — |
| Comparative Example 8 | 107 | 72 | 55 | — |
| Example 39 | 108 | 96 | 90 | 89 |
| Example 40 | 109 | 95 | 91 | 90 |
| Example 41 | 111 | 96 | 91 | 91 |
| Comparative Example 9 | 116 | 84 | 74 | 70 |

It was confirmed that the polymer electrolytes of the invention exhibit good film-forming properties and film stability and provide a high ionic conductivity while those of the comparative examples cannot satisfy both the requirements for film-forming properties and ionic conductivity at the same time. It was also confirmed that the secondary batteries comprising polymer electrolytes of the invention exhibit an excellent life cycle performance as compared with those comprising the conventional electrolytes.

Industrial Applicability

The electrolyte for secondary battery which is a polymer electrolyte of the invention provides a high ionic conductivity and gives an excellent safety and thus is useful as a material for electrochemical device such as battery. The use of the electrolyte of the invention makes it possible to obtain a secondary battery device having a high ionic conductivity over a wide temperature range and an excellent cycle life performance and safety.

What is claimed is:

1. An electrolyte for secondary battery comprising an ionic compound and an organic polymer compound, wherein the organic polymer compound comprises a boric acid ester compound obtained by the esterification of a compound represented by the general formula (1) with boric acid or boric anhydride:

$$Z^1\text{---}[(A^1O)_l\text{---}R^1]_a \quad (1)$$

wherein $Z^1$ represents a residue of compound having from 1 to 6 hydroxyl groups; $A^1O$ represents one or a mixture of two or more of $C_2\text{--}C_4$ oxyalkylene groups; $R^1$ represents a group selected from the group consisting of cyanoethyl group, $C_1\text{--}C_{12}$ hydrocarbon group and hydrogen atom; l represents an integer of from 0 to 600; and the suffix a represents an integer of from 1 to 6, with the proviso that la ranges from 0 to 600.

2. The electrolyte for secondary battery according to claim 1, wherein the organic polymer compound comprises a boric acid ester compound obtained by the esterification of a compound represented by the general formula (1) wherein $R^1$ is a hydrogen atom with boric acid or boric anhydride.

3. The electrolyte for secondary battery according to claim 1, wherein the organic polymer compound comprises a nitrile group-containing compound represented by the general formula (1) wherein $R^1$ is a cyanoethyl group.

4. An electrolyte for secondary battery comprising an ionic compound and an organic polymer compound, wherein the organic polymer compound comprises a polymerization product of a polymerization product of a boric acid ester compound obtained by the esterification of a the compound represented by the general formula (2) with boric acid or boric anhydride:

$$Z^2\text{---}[(A^2O)_m\text{---}R^2]_b \quad (2)$$

wherein $Z^2$ represents a residue of compound having from 1 to 4 hydroxyl groups; $A^2O$ represents one or a mixture of two or more of $C_2\text{--}C_4$ oxyalkylene groups; m represents an integer of from 0 to 150; b represents an integer of from 1 to 4, with the proviso that mb ranges from 0 to 300; and $R^2$ represents a hydrogen atom, cyanoethyl group or a group represented by the general formula (3):

$$\begin{array}{c} \text{CH}=\text{C}-\text{C}-\\ |\quad\;\; |\quad\;\; \|\\ R^3\;\; R^4\;\; O \end{array} \quad (3)$$

wherein $R^3$ $R^4$ each represent a hydrogen atom or methyl group.

5. The electrolyte for secondary battery according to claim 4, wherein the organic polymer compound comprises a polymerization product of a boric acid ester compound obtained by the esterification of a compound represented by the general formula (2) wherein $R^2$ is a hydrogen atom with boric acid or boric anhydride.

6. The electrolyte for secondary battery according to claim 4, wherein the organic polymer compound comprises a nitrile group-containing compound represented by the general formula (2) wherein $R^2$ is a cyanoethyl group.

7. The electrolyte for secondary battery according to claim 1, wherein the organic polymer compound further comprises a polymerization product of a compound represented by the general formula (4):

$$Z^3\text{---}[(A^3O)_n\text{---}R^5]_c \quad (4)$$

wherein $Z^3$ represents a residue of compound having from 1 to 4 hydroxyl groups or a hydroxyl group; $A^3O$ represents one or a mixture of two or more of $C_2\text{--}C_4$ oxyalkylene groups; n represents an integer of from 0 to 150; c represents an integer of from 1 to 4, with the proviso that nc ranges from 0 to 300; and $R^5$ represents a hydrogen atom or a group represented by the general formula (5):

$$\begin{array}{c} \text{CH}=\text{C}-\text{C}-\\ |\quad\;\; |\quad\;\; \|\\ R^6\;\; R^7\;\; O \end{array} \quad (5)$$

wherein $R^6$ and $R^7$ each represent a hydrogen atom or methyl group.

8. The electrolyte for secondary battery according to claim 1 or 7, wherein the organic polymer compound further comprises an organic polymer compound represented by the general formula (6):

$$Z^4-[(A^4O)_o-H]_d \quad (6)$$

wherein $Z^4$ represents a residue of compound having from 1 to 6 hydroxyl groups; $A^4O$ represents one or a mixture of two or more of $C_2-C_4$ oxyalkylene groups; o represents an integer of from 100 to 150,000; and d represents an integer of from 1 to 6, with the proviso that od ranges from 100 to 150,000.

9. The electrolyte for secondary battery according to claim 1, wherein the organic polymer compound comprises a polymerization product of a nitrile group-containing compound represented by the general formula (2) or a polymerization product of a boric acid ester compound obtained by the esterification of a nitrile group-containing compound represented by the general formula (2) with boric acid or boric anhydride:

$$Z^2-[(A^2O)_m-R^2]_b \quad (2)$$

wherein $Z^2$ represents a residue of compound having from 1 to 4 hydroxyl groups; $A^2O$ represents one or a mixture of two or more of $C_2-C_4$ oxyalkylene groups; m represents an integer of from 0 to 150; b represents an integer of from 1 to 4, with the proviso that mb ranges from 0 to 300; and $R^2$ represents a hydrogen atom, cyanoethyl group or a group represented by the general formula (3).

10. The electrolyte for secondary battery according to claim 4, wherein the organic polymer compound further comprises a polymerization product of a compound represented by the general formula (4):

$$Z^3-[(A^3O)_n-R^5]_c \quad (4)$$

wherein $Z^3$ represents a residue of compound having from 1 to 4 hydroxyl groups or a hydroxyl group; $A^3O$ represents one or a mixture of two or more of $C_2-C_4$ oxyalkylene groups; n represents an integer of from 0 to 150; c represents an integer of from 1 to 4, with the proviso that nc ranges from 0 to 300; and $R^5$ represents a hydrogen atom or a group represented by the general formula (5).

11. The electrolyte for secondary battery according to claim 9, wherein the organic polymer compound further comprises a polymerization product of a compound represented by the general formula (4):

$$Z^3-[(A^3O)_n-R^5]_c \quad (4)$$

wherein $Z^3$ represents a residue of compound having from 1 to 4 hydroxyl groups or a hydroxyl group; $A^3O$ represents one or a mixture of two or more of $C_2-C_4$ oxyalkylene groups; n represents an integer of from 0 to 150; c represents an integer of from 1 to 4, with the proviso that nc ranges from 0 to 300; and $R^5$ represents a hydrogen atom or a group represented by the general formula (5).

12. The electrolyte for secondary battery according to claim 4, 10 or 11, wherein the organic polymer compound further comprises an organic polymer compound represented by the general formula (6):

$$Z^4-[(A^4O)_o-H]_d \quad (6)$$

wherein $Z^4$ represents a residue of compound having from 1 to 6 hydroxyl groups; $A^4O$ represents one or a mixture of two or more of $C_2-C_4$ oxyalkylene groups; o represents an integer of form 100 to 150,000; and d represents an integer of from 1 to 6, with the proviso that od ranges from 100 to 150,000.

13. The electrolyte for secondary battery according to claim 1, 4, 7, 9, 10 or 11, wherein the ionic compound is an alkaline metal salt or alkaline earth metal salt.

14. The electrolyte for secondary battery according to claim 8, wherein the ionic compound is an alkaline metal salt or alkaline earth metal salt.

15. The electrolyte for secondary battery according to claim 12, wherein the ionic compound is an alkaline metal salt or alkaline earth metal salt.

16. The electrolyte for secondary battery according to claim 13, wherein the ionic compound is a lithium salt.

17. The electrolyte for secondary battery according to claim 14, wherein the ionic compound is a lithium salt.

18. The electrolyte for secondary battery according to claim 15, wherein the ionic compound is a lithium salt.

19. A secondary battery comprising an electrolyte for secondary battery defined in claim 1.

20. A secondary battery comprising an electrolyte for secondary battery defined in claim 4.

21. A secondary battery comprising an electrolyte for secondary battery defined in claim 7.

22. A secondary battery comprising an electrolyte for secondary battery defined in claim 8.

23. A secondary battery comprising an electrolyte for secondary battery defined in claim 9.

24. A secondary battery comprising an electrolyte for secondary battery defined in claim 10.

25. A secondary battery comprising an electrolyte for secondary battery defined in claim 11.

26. A secondary battery comprising an electrolyte for secondary battery defined in claim 12.

27. A secondary battery comprising an electrolyte for secondary battery defined in claim 13.

28. A secondary battery comprising an electrolyte for secondary battery defined in claim 14.

29. A secondary battery comprising an electrolyte for secondary battery defined in claim 15.

30. A secondary battery comprising an electrolyte for secondary battery defined in claim 16.

31. A secondary battery comprising an electrolyte for secondary battery defined in claim 17.

32. A secondary battery comprising an electrolyte for secondary battery defined in claim 18.

* * * * *